May 16, 1961 F. HOMBURGER 2,984,341

MOUNT

Filed Nov. 30, 1959

INVENTOR.
Freddy Homburger
BY
Roberts, Cushman & Grover

ATT'YS

United States Patent Office 2,984,341
Patented May 16, 1961

2,984,341

MOUNT

Freddy Homburger, 759 High St., Dedham, Mass.

Filed Nov. 30, 1959, Ser. No. 856,172

6 Claims. (Cl. 206—56)

This invention relates to a mount for exhibiting one or more specimen slides or other transparent or opaque specimens or samples and the explanatory text, and more especially to mounts which may be incorporated in text books, laboratory reports, or brochures for instructive or advertising purposes.

Incorporation of conventional specimen slides in text books, reports, instructive brochures and the like, has been impractical because of their rigidity, fragility, excessive bulk and weight. Through new techniques, however, it is now possible to make thin, flexible, lightweight specimen slides by sealing sections of the subject matter into cast films of transparent plastic. Such slides can be handled easily without damage and can be made in large quantities at a nominal cost from specimens covering a wide range of subjects, and hence provide an excellent medium for disseminating instructive material of heretofore restricted distribution to students, physicians, druggests, veterinarians and other research men.

The principal object of this invention is to provide means for mounting slides of plastic embedded sections in text books, reports, or brochures, thereby making them widely available without materially increasing their bulk or cost, and in such a manner that the slides may be seen from one or both sides and may be removed, if desired, for study beneath the lens of a microscope and then returned for use by another.

As herein illustrated, the mounting sheet is comparable in thickness to the page of a conventional text book and has one or more portions for removably receiving the slides and adjacent portions for receiving the explanatory text. The portions for receiving the slides each comprise pocket constituted by an opening through the mounting sheet, a backing sheet fastened to one side of the mounting sheet, marginally of the opening, and a transaprent cover sheet disposed in the opening with a part fastened to the mounting sheet and the remainder lodged between the marginal edge of the opening and the backing sheet. The specimen slide is disposed in the opening between the backing sheet and the cover sheet and is visible through the latter without being removed from the pocket. A pull tab is also disposed between the backing sheet and the cover sheet, behind the slide, and has a portion extending forwardly over an edge of the cover sheet to the exterior, which may be pulled forwardly to dislodge the cover sheet from behind the marginal edge of the opening, and simultaneously to pull the slide through the opening. Preferably the mounting sheet is made up of two plies joined back to back and the pocket is constituted by openings through each of the plies, covered back and front by a backing sheet and a transparent window sheet respectively, and defined laterally by unjoined portions of the plies marginally of the opening. A portion of the window sheet is fixed between the plies and the remainder lodged behind the opening with which it is associated. As indicated above, a pull tab is disposed between the window sheet and the backing sheet with a part extending outwardly over the top of the window sheet, the pull being adapted to pull the window sheet through the opening and simultaneously to lift the slide out of the pocket. The backing sheet may optionally be transparent or opaque. The window opening may be of any desired configuration and the window sheet may have parts of its edges underlying the margin of the opening with which it is associated, or may have projecting ears or tabs which underlie the margin of the opening. The window sheet, backing sheet, pull tab and the slide, disposed therebetween, collectively have a thickness which is less than the thickness of the ply or plies making up the mounting sheet.

The invention will now be described in greater detail with reference to the accompanying drawings wherein.

Figure 1:
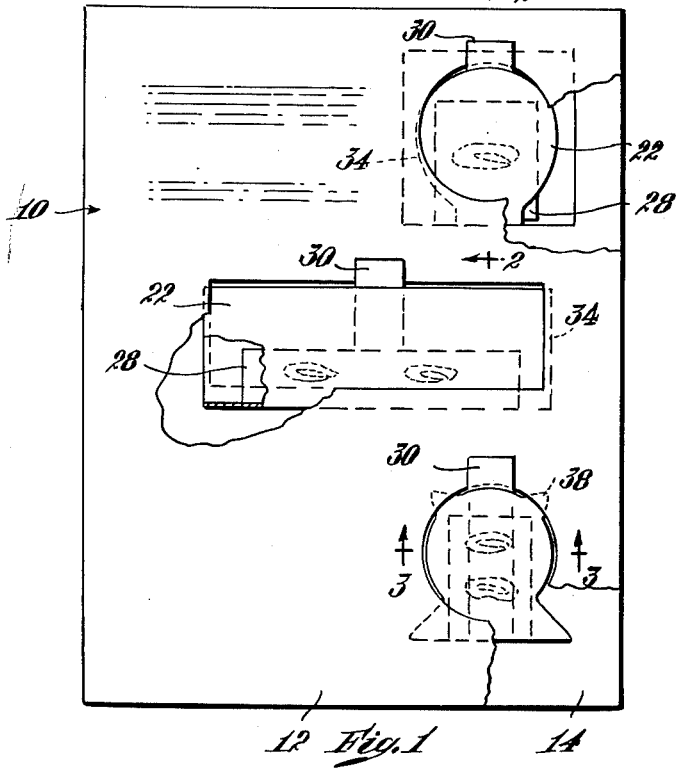
Fig. 1 is a plan view of a mounting sheet, such as may be the page of a text book or a section of a folder.
Figure 2:
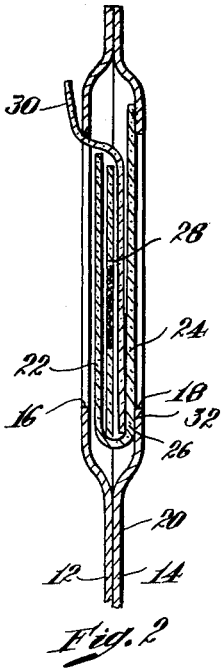
Fig. 2 is a section taken on the line 2—2 of Fig. 1, exaggerated from front to back, so as to show the structure, it being understood however that the actual thickness is less than that of the two plies making up the mounting sheet.
Figure 5:
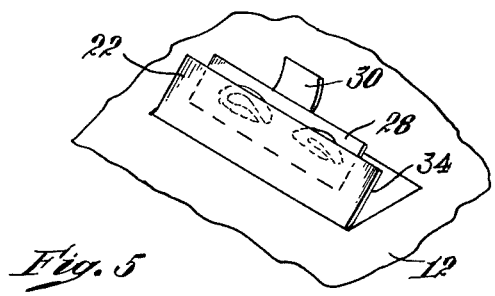
Fig. 5 is a perspective view of a fragmentary portion of the mounting sheet, showing the window sheet pulled out of the opening by means of a pull tab, with the slide pulled out with it.
Figure 4:
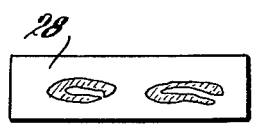
Fig. 4 is a plan view of a slide.

Referring to the drawings, there is shown a mounting sheet 10, comprised of plies 12 and 14, which contain openings 16 and 18 substantially in registration, as indicated in Fig. 2. The plies 12 and 14 are joined, back to back, for example by adhesive 20, except for the portions bounding the openings 16 and 18, which are left unattached. In one form of the invention, transparent window sheets 22 and 24 are disposed in the opening, the rear or backing window sheet 24 being fastened around its entire edge with that portion of the rear ply 14 bounding the opening 18, for example by means of adhesive 26. The front window sheet 22 is fastened at its lower part between the plies, for example its lower end may be an integral part of the backing window sheet 24, folded forwardly therefrom. That part of the front window sheet above the lower edge of the window opening is merely lodged behind the marginal edge of the opening, so that it is retained therein by the marginal edge of the opening. The unjoined portions of the plies, marginally of the opening, together with the front and back window sheets form a pocket within which a plastic slide 28, such as shown in Fig. 4, may be placed for reference in conjunction with explanatory text adjacent the pocket. Since the window sheets are transparent the specimen may be seen from both sides and by holding the page up to the light may be examined through and through. Such slides are adapted for microscopic viewing, hence the front window sheet, which constitutes a hinged closure for the pocket, is adapted to be pulled through the opening 16 to expose the interior of the pocket and to allow the slide to be removed for such examination and then to be replaced. The slide is extremely thin and tends to stick to the back window sheet, making it difficult to pick it out, hence to assist in removing it, a pull tab 30 is disposed in the pocket with its lower end 32 fastened to the back window sheet behind the slide and with its upper end projecting forwardly over the slide and over the top of the window sheet to the exterior so as to be easy to grasp. By pulling on the tab the window sheet and the slide may be pulled through the front opening 16, as shown in Fig. 5, the window sheet being flexible enough so that the edges may be pulled by the margin through the opening without tearing. The window sheet may be restored by pressing its edges 34 through the opening so that they again lie behind the margin of the opening.

The shape of the opening is not important except from the standpoint of the kind and size of slide and an attractive arrangement. That shown in the upper right-hand corner of the page is substantially circular, the front sheet being slightly out of round so that portions of it underlie the marginal edge of the opening. The pocket shown at the center of the sheet is rectangular and the ends of the window sheet extend under the ends of the opening while the top of the sheet is short of the edge of the opening. The pocket at the bottom right-hand corner is circular and the front window sheet is of smaller diameter than the opening but has tabs 38—38 which extend beneath the marginal edge of the opening.

As explained with reference to Fig. 2, the window sheet is an integral extension of the back sheet, however, it may be an independent sheet attached at its lower edge to the rear side of the front ply.

Figure 3:
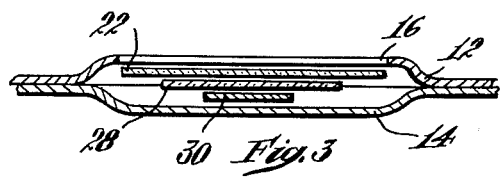
Fig. 3 is a horizontal section taken on the line 3—3 of Fig. 1, exaggerated as in Fig. 2, showing an alternative structure.

Sometimes it is preferable to have the backing sheet opaque so that the printed matter on the next page does not show through. Accordingly, as shown in Fig. 3, the back sheet 14 either has no opening at all, as there shown, or is provided with an opaque backing sheet. In other respects the pocket is formed as described above. The front window sheet 22, in this form, however is fastened directly to the inner side of the front ply. The pull tab 30 is situated at the back of the pocket against the ply 14 and is operable, as previously described, to lift both the slide 28 and the window sheet 22 out of the opening 16.

The size of the openings and hence of the pockets may be varied to accommodate one or more slides.

The front and back sheets of the pocket and the pull tab are preferably made of plastic sheeting which is thin enough so that the composite thickness of the backing sheet, window sheet, slide and pull is less from front to back than the mounting sheet itself. Thus, it will be apparent that the pockets and their content are not bulky and do not interfere with incorporation of the mounting sheet as a page in conventional book-making construction.

While the invention is shown, in its preferred form, as comprised of two plies, it may be made up of three plies or of a single ply. When made up of three plies, two of the plies correspond to the plies 12 and 14, shown in Fig. 2, and the third ply is attached along its upper edge to the front ply 12 so as to cover the front face of the ply 12 and is provided with openings corresponding to the window openings therein. This manner of construction would make it easier from the standpoint of preparing the text.

Figure 6:
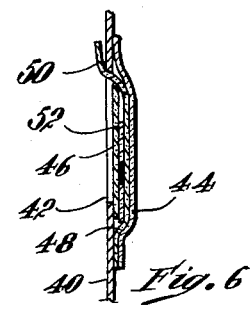
Fig. 6 shows a single ply mounting sheet.

A single ply construction may be employed, as shown in Fig. 6. Referring thereto, a ply 40 has an opening 42 through it. A transparent or opaque backing sheet 44 is attached to the rear side of the ply over the opening. A transparent covering window sheet 46 is attached to the rear side of the ply 40 at its lower edge, leaving its lateral edges free but lodged behind the margin of the window opening between it and the backing 44, and its upper edge substantially even with the upper edge of the opening. A pull 48 is also fastened to the rear side of the ply 40 behind the window sheet, with its upper end 50 extending outwardly over the upper edge of the window sheet through the opening 42. The slide 52 is placed between the window sheet and the pull. As previously pointed out, the composite thickness of the window sheet, backing sheet, pull and slide, is no greater than the thickness of the mounting page itself and hence adds no substantial bulk to the book in which it is incorporated. The only disadvantage of the single sheet construction is that the back side of the mounting sheet is not as finished appearing as the two ply construction.

As thus described, the mount, as previously indicated, may be incorporated in text books, teaching slide collections, promotional material for drug houses, and report forms for pathology purposes when it is desired to mail the physician not only a report but an actual tissue section on which the report is based and the like. Additionally it makes possible offering students, physicians and researchers, concrete examples of the actual tissue section under discussion for examination and study unaided except for the transparency of the slide or with the aid of a microscope.

It should be understood that the present disclosure is for the purpose of illustration only and that this invention includes all modifications and equivalents which fall within the scope of the appended claims.

I claim:

1. A mounting sheet containing an opening, a backing member fixed to the sheet behind the opening, a transparent facing member covering the front side of the opening, said backing member, opening and facing member collectively forming a pocket, said facing member having a part fixed to the sheet, and another part tucked behind the marginal edge of the opening, and a tab situated in the pocket behind the facing member having a portion extending from the pocket, said tab being adapted to pull the facing member forwardly to disengage the portions, tucked behind the opening, to open the pocket.

2. A mounting sheet containing an opening, a backing member fixed to the sheet behind the opening, a transparent facing member covering the front side of the opening, said backing member, opening and facing member collectively forming a pocket, and said facing member being separable in part from the sheet to provide access to the pocket, said pocket being adapted to hold a slide for inspection while situated therein, and being removable therefrom for examination, and a pull tab situated in the pocket behind the facing member with a part extending from the pocket, said pull tab being operable to lift the facing member away from the sheet to expose the interior of the pocket.

3. A mount comprising two plies of sheet material, one of which contains an opening, said plies being joined except marginally of the opening, so that the unjoined portions bounding the opening constitute an interply pocket behind the opening, within which a slide may be placed, a cover disposed within the pocket with a part attached to one of the plies, and the remainder lodged behind the margin surrounding the opening, and a pull tab also disposed in the pocket with a portion projecting outwardly therefrom, in a position to be grasped, and to pull the cover through the opening to expose the interior of the pocket.

4. A mount comprising two plies of sheet material, one of which contains an opening, said plies being joined except marginally of the opening so that the unjoined portions bounding the opening constitute an interply pocket, behind the opening, within which a slide may be placed, a transparent cover fastened along an edge within the opening with other portions lodged behind the marginal edge of the opening, and a pull tab disposed within the opening at the bottom of the pocket so as to be behind the slide situated in the pocket, said tab having a part extending from the pocket outside of the cover and adapted by pulling to pull the slide and cover through the opening.

5. A mount comprising two plies of sheet material containing registering openings, said plies being joined except marginally of the opening, transparent window sheets disposed within the openings, one of which is fastened marginally to the ply containing the opening with which it is associated, the other having a part fastened between the plies, and other parts lodged between the plies behind the opening with which it is associated, said plies being joined except marginally of the opening and said unjoined plies and the window sheets constituting a pocket for holding a slide, a narrow strip attached to the fixed window sheet, extending heightwise thereof and having an end projecting forwardly over the upper part of the movable window sheet to the outside, said strip being adapted to be pulled and thereby to pull the window sheet through the opening to expose the interior of the pocket and simultaneously to lift the slide out of the pocket.

6. A multi-ply mount having portions for receiving slides and adjacent portions for receiving explanatory matter, the portions for receiving slides each comprising a pocket constituted by openings through the plies covered back and front by transparent window sheets, and defined laterally by unjoined portions of the plies marginally of the openings, the remainder of the plies being joined, the front window sheet having a part lodged behind the opening with which it is associated, but not fixed thereto, and a pull tab disposed in the pocket against the back window sheet, with a portion extending forwardly therefrom over the front window sheet to the exterior, said pull tab being operable by pulling to dislodge the front sheet from the opening to expose the interior of the pocket.

References Cited in the file of this patent
UNITED STATES PATENTS 2,619,226   Adams _____ Nov. 25, 1952